(12) United States Patent
Kuratsu

(10) Patent No.: US 11,456,486 B2
(45) Date of Patent: Sep. 27, 2022

(54) NONAQUEOUS ELECTROLYTE SECONDARY BATTERY AND METHOD FOR PRODUCING SAME

(71) Applicant: KANEKA CORPORATION, Osaka (JP)

(72) Inventor: Masato Kuratsu, Settsu (JP)

(73) Assignee: KANEKA CORPORATION, Osaka (JP)

( * ) Notice: Subject to any disclaimer, the term of this patent is extended or adjusted under 35 U.S.C. 154(b) by 277 days.

(21) Appl. No.: 16/664,246

(22) Filed: Oct. 25, 2019

(65) Prior Publication Data
US 2020/0058961 A1 Feb. 20, 2020

Related U.S. Application Data

(63) Continuation of application No. PCT/JP2018/011378, filed on Mar. 22, 2018.

(30) Foreign Application Priority Data

Apr. 28, 2017 (JP) .............................. JP2017-089566

(51) Int. Cl.
*H01M 10/0569* (2010.01)
*H01M 4/505* (2010.01)
(Continued)

(52) U.S. Cl.
CPC ....... *H01M 10/0569* (2013.01); *H01M 4/505* (2013.01); *H01M 4/525* (2013.01);
(Continued)

(58) Field of Classification Search
CPC ......... H01M 10/0569; H01M 10/0525; H01M 4/505; H01M 4/525; H01M 2004/027; H01M 2004/028; H01M 2300/0037
See application file for complete search history.

(56) References Cited

U.S. PATENT DOCUMENTS 6,482,550 B1 11/2002 Imachi et al.
6,534,216 B1 3/2003 Narukawa et al.
(Continued)

FOREIGN PATENT DOCUMENTS

JP 2000-215884 A 8/2000
JP 2001-143705 A 5/2001
(Continued)

OTHER PUBLICATIONS

International Search Report dated May 15, 2018 in PCT/JP2018/011378 filed Mar. 22, 2018.

*Primary Examiner* — Jayne L Mershon
(74) *Attorney, Agent, or Firm* — Oblon, McClelland, Maier & Neustadt, L.L.P.

(57) ABSTRACT

A nonaqueous electrolyte secondary battery which is provided with a positive electrode, a negative electrode and a nonaqueous electrolyte. The positive electrode contains: a positive electrode active material and a compound having a cobalt content of 30% by weight or more. The weight A of the compound and the total weight B of the positive electrode active material satisfy $0.01 \leq A/(A+B) \leq 0.15$. The negative electrode contains a negative electrode active material. The nonaqueous electrolyte contains propylene carbonate and diethyl carbonate as nonaqueous solvents; the total amount of the propylene carbonate and the diethyl carbonate is 70% by volume or more relative to 100% by volume of the nonaqueous solvents; and the volume ratio of the propylene carbonate to the diethyl carbonate is within the range of from 1:1 to 1:19.

15 Claims, 1 Drawing Sheet

(51) Int. Cl.
*H01M 4/525* (2010.01)
*H01M 10/0525* (2010.01)
*H01M 4/02* (2006.01)

(52) U.S. Cl.
CPC .. *H01M 10/0525* (2013.01); *H01M 2004/027* (2013.01); *H01M 2004/028* (2013.01); *H01M 2300/0037* (2013.01)

(56) References Cited

U.S. PATENT DOCUMENTS

| | | | | |
|---|---|---|---|---|
| 2012/0115032 | A1* | 5/2012 | Harada | H01M 4/02 |
| | | | | 429/231.5 |
| 2014/0242466 | A1 | 8/2014 | Murashi et al. | |
| 2016/0049692 | A1* | 2/2016 | Hasegawa | H01M 4/485 |
| | | | | 429/332 |
| 2016/0351891 | A1* | 12/2016 | Sawada | H01M 10/052 |
| 2018/0034053 | A1* | 2/2018 | Takaoka | H01M 4/505 |

FOREIGN PATENT DOCUMENTS

| | | |
|---|---|---|
| WO | WO 2014/155992 A1 | 10/2014 |
| WO | WO 2015/107832 A1 | 7/2015 |
| WO | WO 2016/129527 A1 | 8/2016 |

* cited by examiner

NONAQUEOUS ELECTROLYTE SECONDARY BATTERY AND METHOD FOR PRODUCING SAME

CROSS-REFERENCE TO RELATED APPLICATIONS

The present application is a continuation of International patent application No. PCT/JP2018/011378, filed on Mar. 22, 2018, which is based on and claims the benefits of priority to Japanese Application No. 2017-089566, filed on Apr. 28, 2017. The entire contents of all of the above applications are incorporated herein by reference.

TECHNICAL FIELD

The present invention relates to a nonaqueous electrolyte secondary battery and a method for producing the same.

BACKGROUND ART

A nonaqueous electrolyte secondary battery is used in a hybrid vehicle, an electric vehicle, a household electricity storage system, and the like including a mobile device, and is required to have a good balance among a plurality of performances such as electric capacity, safety, and operation stability.

For example, a nonaqueous electrolyte secondary battery has been developed in which carbon is used in a negative electrode active material, a mixture of lithium manganese oxide and lithium cobalt oxide is used in a positive electrode active material, and vinylene carbonate is added to a non-aqueous electrolyte (Patent Document 1). This nonaqueous electrolyte secondary battery suppresses gas generation by the action of the lithium cobalt oxide and the vinylene carbonate, and as a result, a battery having a high capacity and favorable operation stability is obtained.

Patent Document 1: Japanese Unexamined Patent Application, Publication No. 2001-143705

DISCLOSURE OF THE INVENTION

Problems to be Solved by the Invention

However, when carbon is used in the negative electrode active material, there is a problem of safety that a battery generates heat or is ignited by occurrence of internal short-circuit or the like. Further, when a negative electrode active material operating at a higher potential than that of carbon is used, safety is improved but gas generation cannot be suppressed even by adding an additive such as vinylene carbonate to the nonaqueous electrolyte so that the battery swells, and as a result, a problem arises in that performances are degraded. Therefore, there is a room for improvement.

Means for Solving the Problems

The present invention has been made to solve the above-described problems. An object thereof is to provide a non-aqueous electrolyte secondary battery in which gas generation is suppressed without using an additive in a nonaqueous electrolyte in the case of using a highly safe negative electrode active material having a higher average operating potential than that of carbon, and as a result, a high capacity retention rate is obtained, a method for producing the same, and an assembled battery.

That is, a nonaqueous electrolyte secondary battery is a nonaqueous electrolyte secondary battery including at least a positive electrode, a negative electrode, and a nonaqueous electrolyte, in which the positive electrode contains a positive electrode active material having an average operating potential of from 3.0 V (vs. Li/Li$^+$) to 4.5 V (vs. Li/Li$^+$) (inclusive) for deintercalation and intercalation of lithium ions, the positive electrode further contains a compound having a cobalt content of 30% by weight or more, in a case where a weight of the compound having the cobalt content of 30% by weight or more is designated as A and the total weight of the positive electrode active material is designated as B, a relation of $0.01 \leq A/(A+B) \leq 0.15$ is satisfied, the negative electrode contains a negative electrode active material having an average operating potential of 0.5 V (vs. Li/Li$^+$) or more and less than 2.0 V (vs. Li/Li$^+$) for deintercalation and intercalation of lithium ions, the nonaqueous electrolyte contains at least propylene carbonate and diethyl carbonate as nonaqueous solvents, the total amount of the propylene carbonate and the diethyl carbonate being 70% by volume or more with respect to 100% by volume of the nonaqueous solvents, and a volume ratio of the propylene carbonate to the diethyl carbonate is within the range of from 1:1 to 1:19.

Effects of the Invention

According to the present invention, it is possible to obtain a nonaqueous electrolyte secondary battery which is less likely to generate gas even when the battery is repeatedly charged and discharged, has a small decrease in capacity retention rate, and has excellent cycle stability.

PREFERRED MODE FOR CARRYING OUT THE INVENTION

Figure 1:
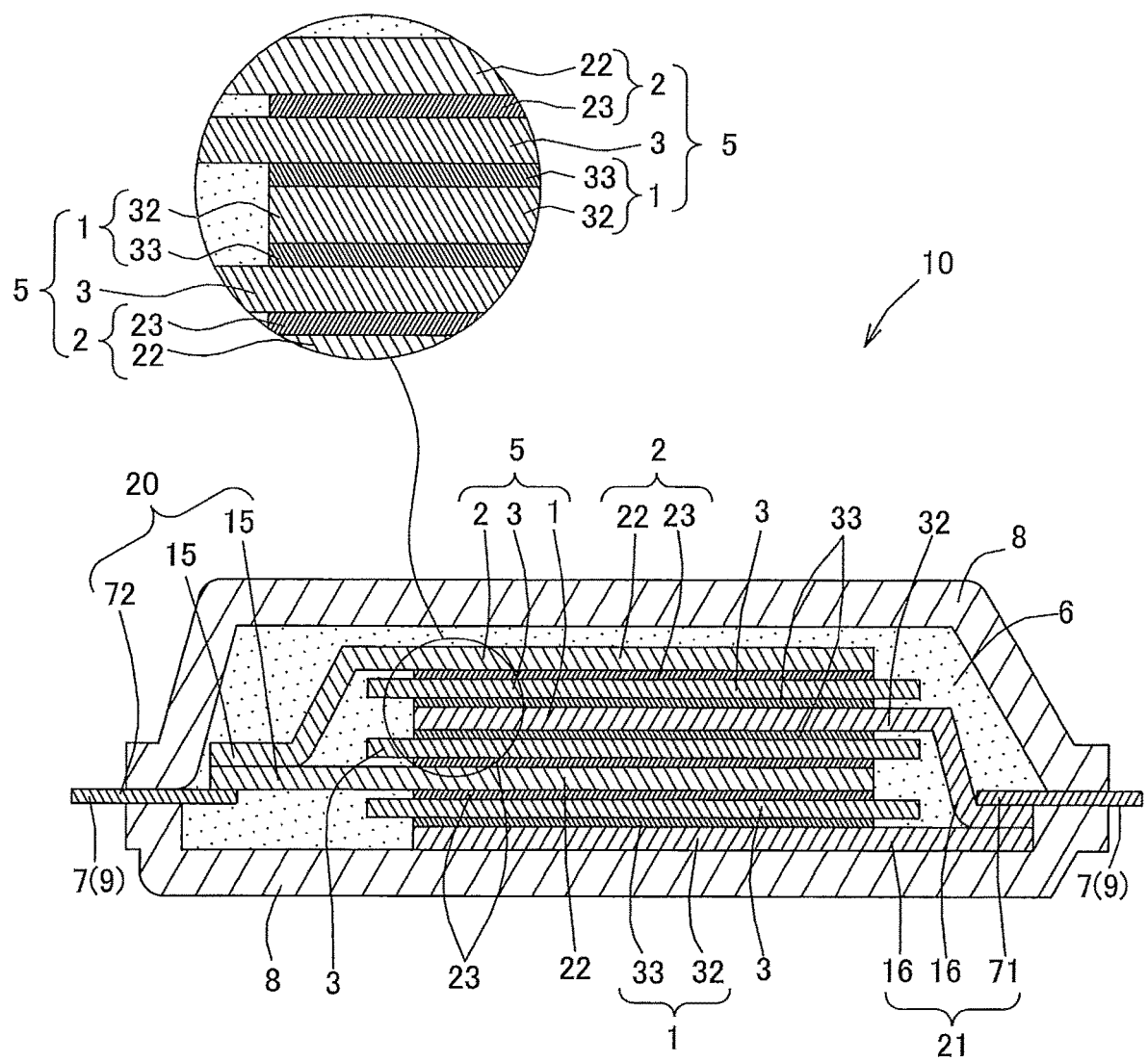
FIG. 1 is a cross-sectional view of a nonaqueous electrolyte secondary battery.

An embodiment of the present invention will be described by means of FIG. 1. Incidentally, the digits subsequent to significant digits in a numerical range should all be rounded off.

FIG. 1 is a cross-sectional view of a nonaqueous electrolyte secondary battery. A nonaqueous electrolyte secondary battery 10 includes a plurality of negative electrodes 1 and a plurality of positive electrodes 2 in an inclusion body 8, and a separator 3 is arranged between each positive electrode 2 and each negative electrode 1.

Further, a terminal 7 is electrically connected to each positive electrode 2 and each negative electrode 1.

Each terminal 7 electrically connected to the positive electrode 2 and the negative electrode 1 has at least two terminal-extending parts 9 extending to the outside of the inclusion body 8. That is, the nonaqueous electrolyte secondary battery 10 has two terminal-extending parts 9 extending outward from the inclusion body 8.

1. Nonaqueous Electrolyte

The nonaqueous electrolyte mediates transmission of ions between the negative electrode and the positive electrode.

It is required that the nonaqueous electrolyte contains at least a nonaqueous solvent and an electrolyte, contains at least propylene carbonate and diethyl carbonate as nonaqueous solvents, the total amount of the propylene carbonate and the diethyl carbonate is 70% by volume or more with respect to 100% by volume of the whole nonaqueous solvents, and the volume ratio of the propylene carbonate to the diethyl carbonate (propylene carbonate:diethyl carbonate) is within the range of from 1:1 to 1:19.

With the above-described nonaqueous solvent composition, gas generation can be suppressed by a synergetic effect with the compound having a cobalt content of 30% by weight or more included in the positive electrode described later, and as a result, cycle characteristics of the battery are improved.

The total amount of the propylene carbonate and the diethyl carbonate is 70% by volume or more, preferably 80% by volume or more, and more preferably 90% by volume or more with respect to 100% by volume of the whole nonaqueous solvents.

The volume ratio of the propylene carbonate to the diethyl carbonate is from 1:1 to 1:19, preferably from 1:1.5 to 1:9, and more preferably from 1:1.5 to 1:6.

As a solvent other than the propylene carbonate and the diethyl carbonate, other nonaqueous solvents can be suitably used as long as the above-described conditions are satisfied. From the viewpoint that the decomposition of the solvent in the average operating potential of the nonaqueous electrolyte secondary battery is less likely to occur, an aprotic solvent and/or an aprotic polar solvent are preferable, and an aprotic polar solvent is more preferable. Examples thereof include carbonate, ester, lactone, sulfone, nitrile, and ethers. Specific examples thereof include ethylene carbonate, fluoroethylene carbonate, butylene carbonate, dimethyl carbonate, ethyl methyl carbonate, dipropyl carbonate, methylpropyl carbonate, acetonitrile, γ-butyrolactone, 1,2-dimethoxyethane, sulfolane, dioxolan, and methyl propionate.

A plurality of kinds of these solvents may be mixed for use for adjusting a balance among viscosity, soluble lithium ion conductivity, and the like.

The average operating potential described herein means an average value of the potential range in which the intercalation-deintercalation reaction of Li ions can be stably carried out by the positive electrode active material and the negative electrode active material.

The electrolyte contains, as a lithium salt, $LiPF_6$, $LiClO_4$, $LiBF_4$, $LiAsF_6$, $LiCF_3SO_3$, lithium bis (oxalato) borate (LiBOB), $Li[N(SO_2CF_3)_2]$, $Li[N(SO_2C_2F_5)_2]$, $Li[N(SO_2F)_2]$, $Li[N(CN)_2]$, or the like, and the concentration of the lithium salt is suitably from 0.5 mol/L to 1.5 mol/L (inclusive).

The nonaqueous electrolyte may be contained in the positive electrode, the negative electrode, and the separator in advance or may be added after one in which the separator is arranged between the positive electrode and the negative electrode is laminated.

The nonaqueous electrolyte may be an electrolytic solution obtained by dissolving an electrolyte in a nonaqueous solvent or may be a gel electrolyte obtained by immersing an electrolytic solution, which is obtained by dissolving an electrolyte in a nonaqueous solvent, in a polymer.

The amount of the nonaqueous electrolyte is appropriately adjusted according to the areas of the positive electrode, the negative electrode, and the separator, the amounts of the active materials, and a volume of the battery.

The nonaqueous electrolyte may contain an additive such as a flame retardant. Examples of the flame retardant include tris(2,2,2-trifluoroethyl) phosphate and ethoxy(pentafluoro)cyclotriphosphazene, and examples of the additive include vinylene carbonate, 1,3-propane sultone, and succinonitrile.

2. Positive Electrode

In the positive electrode, charging and discharging of the nonaqueous electrolyte secondary battery are carried out by intercalation and deintercalation of lithium ions, and the positive electrode contains a positive electrode active material capable of performing intercalation and deintercalation of lithium ions.

The positive electrode active material is required to have an average operating potential of from 3.0 V (vs. Li/Li$^+$) to 4.5 V (vs. Li/Li$^+$) (inclusive).

"(vs. Li/Li$^+$)" described herein refers to a potential difference between an operating electrode composed of an electrode containing a positive electrode active material and a counter electrode formed by lithium metal.

As the positive electrode active material, a metal oxide, a lithium transition metal composite oxide, or the like is suitably used.

Examples of the lithium transition metal composite oxide include lithium transition metal composite oxides having a stratified rock salt type structure or a spinel type structure, and from the viewpoint of showing favorable cycle characteristics, a spinel type lithium manganese oxide represented by Formula (1) is preferable.

$$Li_{1+x}M_yMn_{2-x-y}O_4 \quad (1)$$

(0≤x≤0.2, 0<y≤0.6, and M includes at least one element selected from the group consisting of elements belonging to Groups 2 to 13 and Periods 3 and 4 (provided that, Mn is excluded))

Regarding the spinel type lithium manganese oxide is, from the viewpoint of having a large effect of improving stability of the positive electrode active material itself, M in Formula (1) is preferably Al, Mg, Zn, Ni, Co, Fe, Ti, Cu, Zr, or Cr, and from the viewpoint of having a particularly large effect of improving stability of the positive electrode active material itself, M is more preferably Al, Mg, Zn, Ti, or Ni.

The spinel type lithium manganese oxide is, from the viewpoint of having a high average voltage and a favorable energy density, preferably $Li_{1+x}Al_yMn_{2-x-y}O_4$ (0≤x≤0.1, 0<y≤0.1),
$Li_{1+x}Mg_yMn_{2-x-y}O_4$ (0≤x≤0.1, 0<y≤0.1),
$Li_{1+x}Zn_yMn_{2-x-y}O_4$ (0≤x≤0.1, 0<y≤0.1), or
$Li_{1+x}Cr_yMn_{2-x-y}O_4$ (0≤x≤0.1, 0<y≤0.1),
more preferably
$Li_{1+x}Al_yMn_{2-x-y}O_4$ (0≤x≤0.1, 0<y≤0.1), or
$Li_{1+x}Mg_yMn_{2-x-y}O_4$ (0≤x≤0.1, 0<y≤0.1), and
further preferably
$Li_{1+x}Al_yMn_{2-x-y}O_4$ (0≤x≤0.1, 0<y≤0.1).

Further, as the positive electrode active material, an olivine type manganese lithium phosphate represented by Formula (2) and having a large capacity can also be suitably used.

$$Li_{1+a}M_bMn_{1-a-b}PO_4 \quad (2)$$

(0≤a≤0.1, 0≤b≤0.3, and M includes at least one element selected from the group consisting of elements belonging to Groups 2 to 13 and Periods 3 and 4 (provided that, Mn is excluded))

Further, from the viewpoint of a large effect of improving electrical characteristics, M in Formula (2) is preferably Al, Mg, Zn, Ni, Co, Fe, Ti, or Zr, and more preferably Al, Mg, Zn, Ti, or Fe.

Further, the olivine type manganese lithium phosphate is, from the viewpoint of achieving a good balance between battery characteristics and energy density, more preferably $Li_{1+a}Mg_bMn_{1-a-b}PO_4$ (0≤a≤0.1, 0≤b≤0.3), $Li_{1+a}Al_bMn_{1-a-b}PO_4$ (0≤a≤0.1, 0≤b≤0.3), $Li_{1+a}Fe_bMn_{1-a-b}PO_4$ (0≤a≤0.1, 0≤b≤0.3), or $Li_{1+a}Mg_cFe_{b-c}Mn_{1-a-b}PO_4$ (0≤a≤0.1, 0≤b≤0.3, 0≤c≤0.1).

The surface of the positive electrode active material may be covered with a carbon material, a metal oxide, a polymer, or the like for the purpose of obtaining favorable conductivity and stability.

Among these positive electrode active materials, in consideration of battery performance obtained by a combination with the negative electrode active material, a positive electrode active material may be appropriately selected. Further, a plurality of these positive electrode active materials may be used in combination.

In the positive electrode, it is required to contain a compound having a cobalt content of 30% by weight or more (hereinafter, also referred to as a cobalt-containing compound). Examples of the compound having a cobalt content of 30% by weight or more include cobalt oxide, cobalt hydroxide, cobalt fluoride, cobalt sulfide, cobalt carbonate, and alkali metal salt of cobaltic acid, and from the viewpoint of stability, cobalt oxide or alkali metal salt of cobaltic acid is preferable, from the viewpoint of obtaining favorable cycle characteristics, alkali metal salt of cobaltic acid is more preferable, and from the viewpoint of a high gas suppression effect, a lithium transition metal composite oxide having a crystal structure of a stratified rock salt type structure such as lithium cobalt oxide is further preferable. The lithium transition metal composite oxide having a stratified rock salt type structure is preferably a lithium transition metal composite oxide specifically represented by $Li_aNi_bCo_cMn_dX_eO_2$ (provided that, X represents at least one element selected from the group consisting of B, Mg, Al, Si, Ti, V, Cr, Fe, Cu, Zn, Ga, Ge, Sr, Zr, Nb, Mo, In, and Sn, 0<a≤1.2, 0≤b≤0.5, 0.5≤c≤1, 0≤d≤0.5, 0≤e≤0.5, and b+c+d+e=1).

In a case where the weight of the cobalt-containing compound is designated as A and the total weight of the positive electrode active material is designated as B, the amount of the cobalt-containing compound used satisfies a relation of 0.01≤A/(A+B)≤0.15, preferably 0.015≤A/(A+B) ≤0.12, and more preferably 0.02≤A/(A+B)≤0.10. As for the positive electrode active material, the cobalt-containing compound is not contained.

By requiring the cobalt-containing compound, dissolution of metal ions from the positive electrode active material can be suppressed, and the decomposition of the nonaqueous solvent in abnormal activity sites of the negative electrode active material surface can be suppressed.

The positive electrode may contain a conductive additive or a binder.

The conductive additive is a conductive or semi-conductive substance to be added for the purpose of assisting conductivity of an electrode.

As the conductive additive, a metal material or a carbon material is suitably used.

As the metal material, copper, nickel, or the like is suitably used. Further, examples of the carbon material include natural graphite, artificial graphite, vapor-grown carbon fiber, carbon nanotubes, and carbon black such as acetylene black, ketchen black, and furnace black.

These conductive additives may be used singly or in combination of two or more kinds thereof.

The amount of the conductive additive contained in the positive electrode is preferably from 1 part by weight to 30 parts by weight (inclusive), and more preferably from 2 parts by weight to 15 parts by weight (inclusive) with respect to 100 parts by weight of the positive electrode active material. With the above range, conductivity of the positive electrode is ensured. In addition, adhesiveness to the binder described later can be maintained, and sufficient adhesiveness to the current collector can be obtained.

The binder is a material enhancing a binding property between the positive electrode active material and the current collector.

The binder is not particularly limited, but at least one compound selected from the group consisting of polyvinylidene fluoride (PVdF), polytetrafluoroethylene (PTFE), styrene-butadiene rubber, polyimide, and derivative thereof is suitably used.

The amount of the binder is preferably from 1 part by weight to 30 parts by weight (inclusive), and more preferably from 2 parts by weight to 15 parts by weight (inclusive) with respect to 100 parts by weight of the positive electrode active material. With the above range, adhesiveness between the positive electrode active material and the conductive additive is maintained, and adhesiveness to the current collector is sufficiently obtained.

As a method for producing the positive electrode, a method is suitably used in which the positive electrode containing a positive electrode active material layer is prepared by preparing a slurry using the positive electrode active material, the cobalt-containing compound, and a solvent, then applying the slurry on the current collector, and removing the solvent.

The positive electrode active material layer described herein is a layer in the positive electrode and indicates a layer containing a positive electrode active material contributing to intercalation and deintercalation of lithium ions in the positive electrode.

The preparation of the slurry may be conducted by using conventionally known techniques. In addition, also regarding the solvent for the slurry, the applying of the slurry, and the removing of the solvent, conventionally known techniques may be used.

The positive electrode active material layer is suitably used as long as the thickness thereof is from 10 μm to 200 μm (inclusive).

The density of the positive electrode active material layer is preferably from 1.0 g/cm$^3$ to 4.0 g/cm$^3$ (inclusive), more preferably from 1.5 g/cm$^3$ to 3.5 g/cm$^3$ (inclusive), and further preferably from 2.0 g/cm$^3$ to 3.0 g/cm$^3$ (inclusive).

When the density of the positive electrode active material layer is 1.0 g/cm$^3$ or more, the contact between the aforementioned conductive additive and the positive electrode active material becomes favorable, and when the density thereof is 4.0 g/cm$^3$ or less, the nonaqueous electrolyte is allowed to easily penetrate into the positive electrode.

The density of the positive electrode active material layer may be adjusted by compressing the positive electrode.

In the compressing method, a roll press, a hydraulic press, or the like is suitably used.

The current collector is a member collecting currents from the positive electrode active material or the negative electrode active material.

In the positive electrode, the same active material layer may be formed on one surface or both surfaces of the current collector, and the positive electrode may have a form in which the positive electrode active material layer is formed on one surface of the current collector and the negative electrode active material layer is formed on the other surface, that is, may be a bipolar electrode.

The thickness of the current collector is not particularly limited, and is preferably from 10 µm to 100 µm (inclusive).

As the current collector, aluminum or an alloy thereof is preferable, and from the viewpoint of being stable in a positive electrode reaction atmosphere, high purity aluminum represented by JIS standard 1030, 1050, 1085, 1N90, 1N99, or the like is preferable, or an alloy thereof is preferable.

3. Negative Electrode

The negative electrode contains a negative electrode active material having an average operating potential of 0.5 V (vs. Li/Li$^+$) or more and less than 2.0 V (vs. Li/Li$^+$) for deintercalation and intercalation of lithium ions, and for example, a metal oxide, a lithium metal oxide, or a metal organic framework is suitably used, and a titanium oxide compound, lithium titanium oxide, a titanium-containing oxide such as titanium dioxide, a metal organic framework, or the like is suitably used.

The surface of the negative electrode active material may be covered with a carbon material, a metal oxide, a polymer, or the like for the purpose of obtaining favorable conductivity and stability.

The titanium-containing oxide may contain a trace amount of an element other than titanium, such as lithium or niobium (Nb).

As the titanium oxide compound, $H_2Ti_3O_7$, $H_2Ti_4O_9$, $H_2Ti_5O_{11}$, $H_2Ti_6O_{13}$, or $H_2Ti_{12}O_{25}$ is preferable, from the viewpoint that cycle characteristics are stable, $H_2Ti_{12}O_{25}$ is more preferable.

As the lithium titanium oxide, lithium titanium oxide having a spinel type structure, or lithium titanium oxide having a ramsdellight type structure is preferable and lithium titanium oxide represented by $Li_4Ti_5O_{12}$ as the molecular formula is preferable. In the case of the spinel type, expansion and contraction of the active material in the intercalation-deintercalation reaction of lithium ions are small.

Examples of the titanium dioxide include a bronze (B) type titanium dioxide, an anatase type titanium dioxide, and a ramsdellight type titanium dioxide. From the viewpoint of having a small irreversible capacity and excellent cycle stability, a B type titanium dioxide is preferable.

Particularly preferably, the titanium-containing oxide is set to $Li_4Ti_5O_{12}$.

These titanium-containing oxides may be used singly or in combination of two or more kinds thereof.

Examples of the metal organic framework include alkali metal salts of carboxylic acid anions having an aromatic ring structure in an organic backbone layer. Examples of the aromatic ring structure include benzene, biphenyl, and terphenyl, and the aromatic ring structure may be a condensed polycyclic structure such as naphthalene, anthracene, or pyrene. The number of aromatic rings in the organic backbone is preferably from 1 to 5 from the viewpoint of energy density and stability. It is preferable to have two or more carboxylic acid anion moieties per one molecule, and the carboxylic acid anion moiety is preferably at a diagonally opposite position of the organic backbone layer. For example, as the diagonal position, the 1- and 4-positions in the case of benzene, the 2- and 6-positions in the case of naphthalene, and the 2- and 7-positions in the case of pyrene are mentioned. Substituents may be introduced into the organic backbone layer in order to adjust charging and discharging performance. Suitable examples thereof include lithium terephthalate, lithium 2,6-naphthalenedicarboxylate, and lithium 2,7-pyrenedicarboxylate.

The negative electrode may contain a conductive additive or a binder.

Regarding the type of the conductive additive or binder, the same type as that used in the positive electrode is used, and the same amount as the amount in the positive electrode is also used.

As a method for producing the negative electrode, a method is suitably used in which the negative electrode containing a negative electrode active material layer is prepared by preparing a slurry using the negative electrode active material and a solvent, then applying the slurry on the current collector, and removing the solvent.

The preparation of the slurry may be conducted by using conventionally known techniques. In addition, also regarding the solvent for the slurry, the applying of the slurry, and the removing of the solvent, conventionally known techniques may be used.

The negative electrode active material layer is suitably used as long as the thickness thereof is from 10 µm to 200 µm (inclusive).

The density of the negative electrode active material layer is preferably from 0.5 g/cm$^3$ to 3.0 g/cm$^3$ (inclusive), more preferably from 0.7 g/cm$^3$ to 2.7 g/cm$^3$ (inclusive), and further preferably from 1.0 g/cm$^3$ to 2.5 g/cm$^3$ (inclusive).

When the density of the negative electrode active material layer is 1.0 g/cm$^3$ or more, the contact between the aforementioned conductive additive and the negative electrode active material becomes favorable, and when the density thereof is 3.0 g/cm$^3$ or less, the nonaqueous electrolyte is allowed to easily penetrate into the negative electrode.

The density of the negative electrode active material layer may be adjusted by compressing the negative electrode.

In the compressing method, a roll press, a hydraulic press, or the like is suitably used.

The current collector is a member collecting currents from the positive electrode active material or the negative electrode active material.

In the negative electrode, the same active material layer may be formed on one surface or both surfaces of the current collector, and the negative electrode may have a form in which the positive electrode active material layer is formed on one surface of the current collector and the negative electrode active material layer is formed on the other surface, that is, may be a bipolar electrode.

The thickness of the current collector is not particularly limited, but is preferably from 10 µm to 100 µm (inclusive).

As the current collector, copper, nickel, aluminum, an alloy thereof, or the like is mentioned, but from the viewpoint of corrosion resistance and weight, aluminum or an alloy thereof is preferable, high purity aluminum represented by JIS standard 1030, 1050, 1085, 1N90, 1N99, or the like is preferable, or an alloy thereof is preferable.

4. Separator

The separator is arranged between the positive electrode and the negative electrode, and has a function as a medium that mediates conduction of lithium ions between the positive electrode and the negative electrode while preventing conduction of electrons and holes between the positive electrode and the negative electrode, and does not have at least electron or hole conductivity.

As the separator, nylon, cellulose, polysulfone, polyethylene, polypropylene, polybutene, polyacrylonitrile, polyimide, polyamide, polyethylene terephthalate, and a combination of two or more kinds thereof can be suitably used.

As a shape of the separator, a woven fabric, a nonwoven fabric, a microporous membrane, or the like is suitably used as long as the material can form a structure that can be arranged between the positive electrode and the negative electrode, is insulating, and can contain the nonaqueous electrolyte.

The separator may contain a plasticizer, an antioxidant, or a flame retardant, and may be coated with a metal oxide or the like.

The thickness of the separator is preferably from 10 μm to 100 μm (inclusive), and further preferably from 12 μm to 50 μm (inclusive).

The porosity of the separator is preferably from 30% to 90% (inclusive), and from the viewpoint of achieving a good balance between lithium ion diffusivity and a short circuit prevention property, is more preferably from 35% to 85% (inclusive), and from the viewpoint of having particularly excellent balance, is further preferably from 40% to 80% (inclusive).

5. Nonaqueous Electrolyte Secondary Battery

The inclusion body is a member that encapsulates the laminate obtained by alternately laminating or winding the positive electrode, the negative electrode, and the separator, and the terminals that electrically connects the laminate.

The number of layers in the laminate may be appropriately adjusted for the purpose of obtaining a desired voltage value and battery capacity.

As the inclusion body, a composite film in which a thermoplastic resin layer for heat sealing is provided on a metal foil, a metal layer formed by vapor deposition or sputtering, or a metal can having a square, elliptical, cylindrical, coin, button, or sheet shape is suitably used, and a composite film is more preferable.

As the metal foil of the composite film, from the viewpoint that a balance among a moisture blocking property, a weight, and a cost is good, an aluminum foil is suitably used.

As the thermoplastic resin layer of the composite film, from the viewpoint of a heat-sealing temperature range and a blocking property of the nonaqueous electrolyte are good, polyethylene or polypropylene is suitably used.

In the nonaqueous electrolyte secondary battery 10, a plurality of secondary battery cells 5 of laminates including the positive electrode 2/the separator 3/the negative electrode 1, or the negative electrode 1/the separator 3/the positive electrode 2 are laminated, and for example, other necessary members are attached thereto, thereby forming an electrode group.

Further, in the nonaqueous electrolyte secondary battery 10, a nonaqueous electrolyte 6 is filled in the inclusion body 8, and at least active material parts of the electrodes 1 and 2 of electrode members 21 and 20 of each secondary battery cell 5 are immersed in the nonaqueous electrolyte 6.

Herein, a member including the positive electrode 2 or the negative electrode 1 which is connected to a positive electrode terminal 72 or a negative electrode terminal 71 is referred to as the positive electrode member 20 or the negative electrode member 21.

The positive electrode member 20 and the negative electrode member 21 have a plurality of electrode forming members 15 and 16 and connect end portions of the respective electrode forming members 15 and 16 to the terminals 72 and 71.

In the electrode forming members 15 and 16, active material layers 23 and 33 containing an active material of each of the electrodes 2 and 1 are formed on conductive current collectors 22 and 32.

The area ratio of the electrodes 1 and 2 in the nonaqueous electrolyte secondary battery 10 can be appropriately selected according to the design of the battery. From the viewpoint of cycle stability and safety, the area ratio thereof preferably satisfies the following Formula (3).

$$1 \leq B/A \leq 1.2 \tag{3}$$

Provided that, A represents an area of the positive electrode and B represents an area of the negative electrode.

Further, the area ratio of the negative electrode 1 and the separator 3 is not particularly limited, but preferably satisfies the following Formula (4).

$$1 \leq C/B \leq 1.4 \tag{4}$$

Provided that, B represents an area of the negative electrode and C represents an area of the separator.

An assembled battery may be formed by connecting a plurality of the nonaqueous electrolyte secondary batteries 10.

In the assembled battery, the plurality of the batteries may be appropriately connected in series and/or in parallel according to a desired size, capacity, or voltage.

The assembled battery is preferably provided with a control circuit for confirming a state of charge of each battery and improving safety.

EXAMPLES

Hereinafter, the present invention will be described in more detail by means of Examples, but the present invention is not limited to these Examples.

Incidentally, material names of abbreviations are as follows.
EC: ethylene carbonate
PC: propylene carbonate
DMC: dimethyl carbonate
DEC: diethyl carbonate
EMC: ethyl methyl carbonate

Example 1

A spinel type lithium manganese oxide ($Li_{1.1}Al_{0.1}Mn_{1.8}O_4$) as a positive electrode active material, lithium cobalt oxide containing cobalt content of 60% by weight (wt %) as a cobalt-containing compound, acetylene black as a conductive additive, and PVdF as a binder were mixed such that their solid content concentrations were respectively 100 parts by weight, 5 parts by weight, 5 parts by weight, and 5 parts by weight, thereby preparing a positive electrode slurry.

Incidentally, a binder adjusted to a 5 wt % N-methyl-2-pyrrolidone (NMP) solution was used.

Next, the positive electrode slurry was diluted with NMP and then was coated on one surface of an aluminum foil having a thickness of 20 μm, and thereafter was dried in an oven set at 120° C. Thereafter, the rear surface was similarly subjected to coating and drying, and vacuum drying was further performed at 170° C.

Through the above processes, a positive electrode was obtained. The capacity of the positive electrode was 1.0 mAh/cm² and the area of the positive electrode was 50 cm² for one surface.

Next, a spinel type lithium titanium oxide ($Li_{4/3}Ti_{5/3}O_4$) having an average particle diameter of 5 μm and a specific surface area of 4 m²/g as a negative electrode active material, acetylene black as a conductive additive, and PVdF as a binder were mixed such that their solid content concentrations were respectively 100 parts by weight, 5 parts by weight, and 5 parts by weight, thereby preparing a negative electrode slurry.

Incidentally, a binder adjusted to a 5 wt % N-methyl-2-pyrrolidone (NMP) solution was used.

Next, the negative electrode slurry was diluted with NMP and then was coated on one surface of an aluminum foil having a thickness of 20 μm, and thereafter was dried in an oven set at 120° C. Thereafter, the rear surface was similarly subjected to coating and drying, and vacuum drying was further performed at 170° C.

Through the above processes, a negative electrode was obtained. The capacity of the negative electrode was 1.2 mAh/cm² and the area of the negative electrode was 55 cm² for one surface.

Next, 13 sheets of the positive electrode, 14 sheets of the negative electrode, and 28 sheets of the separator of cellulose nonwoven fabric were laminated in the order of separator/negative electrode/separator/positive electrode/separator/negative electrode/separator. Incidentally, the separator had a thickness of 25 μm and an area of 60 cm².

Through the above processes, a laminate was obtained.

Next, terminals were respectively attached to the positive electrode and the negative electrode, the laminate was sandwiched between two aluminum laminate films, and three sides of the aluminum laminate film were subjected to a thermal welding process at 180° C. for 7 seconds twice.

Thereafter, 10 mL of a nonaqueous electrolyte containing $LiPF_6$ as a lithium salt and a mixed solvent having a volume ratio of PC:DEC=30:70, which is a ratio of respective nonaqueous solvents in the whole nonaqueous solvent, was included in the laminate. Then, the aluminum laminate film was sealed by subjecting the remaining side to a thermal welding process at 180° C. for 7 seconds twice under reduced pressure.

Through the above processes, a nonaqueous electrolyte secondary battery was obtained.

Examples 2 to 14

Examples 2 to 14 were the same as Example 1, except that each member was changed as presented in Table 1.

Comparative Examples 1 to 10

Comparative Examples 1 to 10 were the same as Example 1, except that each member was changed as presented in Table 1.

Evaluation of Cycle Characteristics of Nonaqueous Electrolyte Secondary Battery

Each of the nonaqueous electrolyte secondary batteries prepared in Examples and Comparative Examples was connected to a charging and discharging device (HJ1005SD8, manufactured by HOKUTO DENKO CORPORATION) and was subjected to an aging process, and thereafter, charging and discharging were performed.

In the aging process, each of the nonaqueous electrolyte secondary batteries was fully charged, and the battery was left to stand at 60° C. for 168 hours and then gradually cooled to room temperature (25° C.)

After the aging process, 500 mA constant current charging and 1000 mA constant current discharging were repeated 200 times in an environment of 45° C. The charge termination voltage and the discharge termination voltage at this time were respectively set to 2.7 V and 2.0 V. Incidentally, in Example 5 and Comparative Example 5, the charge termination voltage was set to 3.4 V and the discharge termination voltage was set to 2.5 V, and in Comparative Example 4, the charge termination voltage was set to 4.2 V and the discharge termination voltage was set to 3.0 V.

A ratio of a 200th discharge capacity to a 1st discharge capacity was regarded as a capacity retention rate. For example, when the 1st discharge capacity is 100 and the 200th discharge capacity is 80, the capacity retention rate is 80%.

In addition, the amount of gas generated in a cycle test was measured. The amount of gas generated was measured using an electronic densimeter (MDS-3000, manufactured by Alfa Mirage Co., Ltd.) by the Archimedes method.

Evaluation Criteria for Cycle Characteristics of Nonaqueous Electrolyte Secondary Battery The case of having a 200th capacity retention rate of 80% or more was regarded as good, the case of having a 200th capacity retention rate of less than 80% was regarded as poor, the case of having the amount of gas generated after completion of 200 cycles of less than 2.0 cc was regarded as good, and the case of having the amount of gas generated after completion of 200 cycles of 2.0 cc or more was regarded as poor.

TABLE 1

| | Positive electrode active active material | Cobalt-containing compound (Cobalt content) | A/(A + B) | Solvent composition (Vol %) | Negative electrode active material | Capacity retention rate | Amount of gas generated |
|---|---|---|---|---|---|---|---|
| Example1 | $Li_{1.1}Al_{0.1}Mn_{1.8}O_4$ | $LiCoO_2$ (60 wt %) | 0.05 | PC/DEC = 30/70 | $Li_{4/3}Ti_{5/3}O_4$ | 95% | 0 cc |
| Example2 | $Li_{1.1}Al_{0.1}Mn_{1.8}O_4$ | $LiCoO_2$ (60 wt %) | 0.01 | PC/DEC = 30/70 | $Li_{4/3}Ti_{5/3}O_4$ | 92% | 1.1 cc |
| Example3 | $Li_{1.1}Al_{0.1}Mn_{1.8}O_4$ | $LiCoO_2$ (60 wt %) | 0.15 | PC/DEC = 30/70 | $Li_{4/3}Ti_{5/3}O_4$ | 81% | 0 cc |
| Example4 | $Li_{1.1}Al_{0.1}Mn_{1.8}O_4$ | $Co_2O_1$ (71 wt %) | 0.05 | PC/DEC = 30/70 | $Li_{4/3}Ti_{5/3}O_4$ | 87% | 1.8 cc |
| Example5 | $Li_{1.1}Al_{0.1}Mn_{1.8}O_4$ | $LiCoO_2$ (60 wt %) | 0.05 | PC/DEC = 30/70 | Lithium 2,6-naphthalene-dicarboxylate | 83% | 0.5 cc |

TABLE 1-continued

| | Positive electrode active active material | Cobalt-containing compound (Cobalt content) | A/(A + B) | Solvent composition (Vol %) | Negative electrode active material | Capacity retention rate | Amount of gas generated |
|---|---|---|---|---|---|---|---|
| Example6 | $LiNi_{1/3}Co_{1/3}Mn_{1/3}O_2$ | $LiCoO_2$ (60 wt %) | 0.05 | PC/DEC = 30/70 | $Li_{4/3}Ti_{5/3}O_4$ | 93% | 0.2 cc |
| Example7 | $Li_{1.1}Al_{0.1}Mn_{1.8}O_4$ | $LiCoO_2$ (60 wt %) | 0.05 | PC/DEC = 50/50 | $Li_{4/3}Ti_{5/3}O_4$ | 88% | 0 cc |
| Example8 | $Li_{1.1}Al_{0.1}Mn_{1.8}O_4$ | $LiCoO_2$ (60 wt %) | 0.05 | PC/DEC = 40/60 | $Li_{4/3}Ti_{5/3}O_4$ | 91% | 0 cc |
| Example9 | $Li_{1.1}Al_{0.1}Mn_{1.8}O_4$ | $LiCoO_2$ (60 wt %) | 0.05 | PC/DEC = 10/90 | $Li_{4/3}Ti_{5/3}O_4$ | 89% | 0 cc |
| Example10 | $Li_{1.1}Al_{0.1}Mn_{1.8}O_4$ | $LiCoO_2$ (60 wt %) | 0.05 | PC/DEC = 5/95 | $Li_{4/3}Ti_{5/3}O_4$ | 87% | 0 cc |
| Example11 | $Li_{1.1}Al_{0.1}Mn_{1.8}O_4$ | $LiCoO_2$ (60 wt %) | 0.05 | PC/DEC/DMC = 27/63/10 | $Li_{4/3}Ti_{5/3}O_4$ | 90% | 1.1 cc |
| Example12 | $Li_{1.1}Al_{0.1}Mn_{1.8}O_4$ | $LiCoO_2$ (60 wt %) | 0.05 | PC/DEC/EMC = 21/49/30 | $Li_{4/3}Ti_{5/3}O_4$ | 85% | 1.7 cc |
| Example13 | $LiMg_{0.05}Mn_{0.95}PO_4$ | $LiCoO_2$ (60 wt %) | 0.05 | PC/DEC = 30/70 | $Li_{4/3}Ti_{5/3}O_4$ | 89% | 0 cc |
| Example14 | $LiMg_{0.05}Fe_{0.25}Mn_{0.7}PO_4$ | $LiCoO_2$ (60 wt %) | 0.05 | PC/DEC = 30/70 | $Li_{4/3}Ti_{5/3}O_4$ | 93% | 0 cc |
| Comparative Example1 | $Li_{1.1}Al_{0.1}Mn_{1.8}O_4$ | — | 0.00 | PC/DEC = 30/70 | $Li_{4/3}Ti_{5/3}O_4$ | 92% | 6.2 cc |
| Comparative Example2 | $Li_{1.1}Al_{0.1}Mn_{1.8}O_4$ | $LiCoO_2$ (60 wt %) | 0.30 | PC/DEC = 30/70 | $Li_{4/3}Ti_{5/3}O_4$ | 71% | 2.1 cc |
| Comparative Example3 | $Li_{1.1}Al_{0.1}Mn_{1.8}O_4$ | $[Co(NH_3)_6](NO_3)_3$ (17 wt %) | 0.05 | PC/DEC = 30/70 | $Li_{4/3}Ti_{5/3}O_4$ | 70% | 7.7 cc |
| Comparative Example4 | $Li_{1.1}Al_{0.1}Mn_{1.8}O_4$ | $LiCoO_2$ (60 wt %) | 0.05 | PC/DEC = 30/70 | Carbon | 37% | 14.4 cc |
| Comparative Example5 | $LiNi_{0.5}Mn_{1.5}O_4$ | $LiCoO_2$ (60 wt %) | 0.05 | PC/DEC = 30/70 | $Li_{4/3}Ti_{5/3}O_4$ | 66% | 21.0 cc |
| Comparative Example6 | $Li_{1.1}Al_{0.1}Mn_{1.8}O_4$ | $LiCoO_2$ (60 wt %) | 0.05 | PC/DEC/DMC = 18/42/40 | $Li_{4/3}Ti_{5/3}O_4$ | 80% | 3.5 cc |
| Comparative Example7 | $Li_{1.1}Al_{0.1}Mn_{1.8}O_4$ | $LiCoO_2$ (60 wt %) | 0.05 | PC/DEC = 1/99 | $Li_{4/3}Ti_{5/3}O_4$ | 71% | 1.4 cc |
| Comparative Example8 | $Li_{1.1}Al_{0.1}Mn_{1.8}O_4$ | $LiCoO_2$ (60 wt %) | 0.05 | PC/DEC = 90/10 | $Li_{4/3}Ti_{5/3}O_4$ | 75% | 1.9 cc |
| Comparative Example9 | $Li_{1.1}Al_{0.1}Mn_{1.8}O_4$ | $LiCoO_2$ (60 wt %) | 0.05 | EC/DEC = 30/70 | $Li_{4/3}Ti_{5/3}O_4$ | 87% | 2.5 cc |
| Comparative Example10 | $Li_{1.1}Al_{0.1}Mn_{1.8}O_4$ | $LiCoO_2$ (60 wt %) | 0.05 | PC/DMC = 30/70 | $Li_{4/3}Ti_{5/3}O_4$ | 69% | 3.6 cc |

Overall Evaluation of Table 1

In Examples 1 to 14, batteries in which gas generation caused by decomposition of the nonaqueous electrolyte is suppressed by the effects of the cobalt-containing compound of the positive electrode and the solvent composition and which has a small decrease in capacity retention rate and excellent cycle stability satisfying the evaluation criteria, were obtained. On the other hand, in Comparative Examples 1 to 10, since the type and amount of the cobalt-containing compound of the positive electrode and the solvent composition were different, the gas suppression effect was not sufficient, and thus the evaluation criteria were not satisfied.

EXPLANATION OF REFERENCE NUMERALS

1 NEGATIVE ELECTRODE
2 POSITIVE ELECTRODE
3 SEPARATOR
6 NONAQUEOUS ELECTROLYTE
8 INCLUSION BODY
10 NONAQUEOUS ELECTROLYTE SECONDARY BATTERY

The invention claimed is:

1. A nonaqueous electrolyte secondary battery, comprising:

a positive electrode comprising a positive electrode active material, wherein the positive electrode active material has an average operating potential of from 3.0 V (vs. Li/Li$^+$) to 4.5 V (vs. Li/Li$^+$) for deintercalation and intercalation of lithium ions, and the positive electrode active material comprises a spinel type lithium manganese oxide represented by $Li_{1+x}M_yMn_{2-x-y}O_4$, where $0 \leq x \leq 0.2$, $0 < y \leq 0.6$, and M represents at least one element other than Mn selected from the group consisting of elements belonging to Groups 2 to 13 and Periods 3 and 4, or an olivine type manganese lithium phosphate represented by $Li_{1+a}M_bMn_{1-a-b}PO_4$, where $0 \leq a \leq 0.1$, $0 \leq b \leq 0.3$, and M represents at least one element other than Mn selected from the group consisting of elements belonging to Groups 2 to 13 and Periods 3 and 4;

a negative electrode comprising a negative electrode active material, wherein the negative electrode active material has an average operating potential of 0.5 V (vs. Li/Li$^+$) or more and less than 2.0 V (vs. Li/Li$^+$) for deintercalation and intercalation of lithium ions, and the negative electrode active material comprises at least one selected from the group consisting of a titanium-containing oxide and a metal organic framework; and a nonaqueous electrolyte comprising nonaqueous solvents, wherein the nonaqueous solvents consist of propylene carbonate and diethyl carbonate such that a volume ratio of the propylene carbonate to the diethyl carbonate is from 1:1 to 1:19, wherein the positive electrode further comprises a compound having a cobalt content of 30% by weight or more such that a weight A of the compound having the cobalt content of 30% by weight or more and the total weight B of the positive electrode active material satisfy $0.01 \leq A/(A+B) \leq 0.15$.

2. The nonaqueous electrolyte secondary battery according to claim 1, wherein the volume ratio of the propylene carbonate to the diethyl carbonate is from 1:1.5 to 1:9.

3. The nonaqueous electrolyte secondary battery according to claim 1, wherein the weight A and the total weight B satisfy $0.02 \leq A/(A+B) \leq 0.10$.

4. The nonaqueous electrolyte secondary battery according to claim 1, wherein the compound having the cobalt content of 30% by weight or more has a stratified rock salt type structure and is a lithium transition metal composite oxide represented by $Li_aNi_bCo_cMn_dX_eO_2$, where X represents at least one element selected from the group consisting of B, Mg, Al, Si, Ti, V, Cr, Fe, Cu, Zn, Ga, Ge, Sr, Zr, Nb, Mo, In, and Sn, $0<a\leq1.2$, $0\leq b\leq0.5$, $0.5\leq c\leq1$, $0\leq d\leq0.5$, $0\leq e\leq0.5$, and $b+c+d+e=1$.

5. The nonaqueous electrolyte secondary battery according to claim 1, wherein the negative electrode active material comprises the titanium-containing oxide, which is selected from the group consisting of a titanium oxide compound, a lithium titanium oxide, and a titanium dioxide.

6. The nonaqueous electrolyte secondary battery according to claim 1, wherein the positive electrode active material comprises the spinel type lithium manganese oxide represented by $Li_{1+x}M_yMn_{2-x-y}O_4$.

7. An assembled battery, formed by connecting a plurality of the nonaqueous electrolyte secondary batteries according to claim 1.

8. The nonaqueous electrolyte secondary battery according to claim 1, wherein the volume ratio of the propylene carbonate to the diethyl carbonate is from 1:1.5 to 1:6.

9. The nonaqueous electrolyte secondary battery according to claim 1, wherein the nonaqueous electrolyte further comprises at least one lithium salt selected from the group consisting of $LiPF_6$, $LiClO_4$, $LiBF_4$, $LiAsF_6$, $LiCF_3SO_3$, lithium bis (oxalato) borate (LiBOB), $Li[N(SO_2CF_3)_2]$, $Li[N(SO_2C_2F_5)_2]$, $Li[N(SO_2F)_2]$, and $Li[N(CN)_2]$.

10. The nonaqueous electrolyte secondary battery according to claim 1, wherein the compound having the cobalt content of 30% by weight or more comprises $LiCoO_2$.

11. The nonaqueous electrolyte secondary battery according to claim 1, wherein the weight A and the total weight B satisfy $0.01 \leq A/(A+B) \leq 0.05$.

12. The nonaqueous electrolyte secondary battery according to claim 1, wherein the compound having the cobalt content of 30% by weight or more comprises at least 60% by weight of cobalt.

13. The nonaqueous electrolyte secondary battery according to claim 1, wherein the positive electrode active material comprises the spinel type lithium manganese oxide represented by $Li_{1+x}M_yMn_{2-x-y}O_4$, where M represents at least one element selected from the group consisting of Al, Mg, Zn, Ti, and Ni.

14. The nonaqueous electrolyte secondary battery according to claim 1, wherein the positive electrode active material comprises the olivine type manganese lithium phosphate represented by $Li_{1+a}M_bMn_{1-a-b}PO_4$.

15. A method for producing a nonaqueous electrolyte secondary battery, the method comprising:
encapsulating a positive electrode comprising a positive electrode active material, a negative electrode comprising a negative electrode active material, and a nonaqueous electrolyte with an inclusion body such that at least a part of the positive electrode active material and at least a part of the negative electrode active material are immersed in the nonaqueous electrolyte,
wherein the positive electrode active material has an average operating potential of from 3.0 V (vs. Li/Li$^+$) to 4.5 V (vs. Li/Li$^+$), inclusive, for deintercalation and intercalation of lithium ions, and comprises a spinel type lithium manganese oxide represented by $Li_{1+x}M_yMn_{2-x-y}O_4$, where $0\leq x\leq0.2$, $0<y\leq0.6$, and M represents at least one element other than Mn selected from the group consisting of elements belonging to Groups 2 to 13 and Periods 3 and 4, or an olivine type manganese lithium phosphate represented by $Li_{1+a}M_bMn_{1-a-b}PO_4$, where $0\leq a\leq0.1$, $0\leq b\leq0.3$, and M represents at least one element other than Mn selected from the group consisting of elements belonging to Groups 2 to 13 and Periods 3 and 4,
the positive electrode further comprises a compound having a cobalt content of 30% by weight or more such that
a weight A of the compound having the cobalt content of 30% by weight or more and the total weight B of the positive electrode active material satisfy $0.01 \leq A/(A+B) \leq 0.15$,
the negative electrode active material has an average operating potential of 0.5 V (vs. Li/Li$^+$) or more and less than 2.0 V (vs. Li/Li$^+$) for deintercalation and intercalation of lithium ions, and
the nonaqueous electrolyte comprises nonaqueous solvents consisting of propylene carbonate and diethyl carbonate such that a volume ratio of the propylene carbonate to the diethyl carbonate is from 1:1 to 1:19.

\* \* \* \* \*